(12) United States Patent
Yoshida (10) Patent No.: US 9,798,913 B2
(45) Date of Patent: Oct. 24, 2017

(54) ID READING DEVICE

(71) Applicant: NEC Platforms, Ltd., Kawasaki-shi, Kanagawa (JP)

(72) Inventor: Toru Yoshida, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/109,206

(22) PCT Filed: Jan. 5, 2015

(86) PCT No.: PCT/JP2015/050039
§ 371 (c)(1),
(2) Date: Jun. 30, 2016

(87) PCT Pub. No.: WO2015/105068
PCT Pub. Date: Jul. 16, 2015

(65) Prior Publication Data
US 2016/0328589 A1 Nov. 10, 2016

(30) Foreign Application Priority Data
Jan. 7, 2014 (JP) .................................. 2014-000851

(51) Int. Cl.
*G06K 9/24* (2006.01)
*G06K 7/10* (2006.01)
(Continued)

(52) U.S. Cl.
CPC ..... *G06K 7/10732* (2013.01); *G06K 7/10861* (2013.01); *G06K 7/1413* (2013.01);
(Continued)

(58) Field of Classification Search
CPC ............. G06K 7/0693; G06K 7/10584; G06K 2207/1016
(Continued)

(56) References Cited

U.S. PATENT DOCUMENTS

| 5,959,866 A | 9/1999 | Hanaoka et al. |
| 7,568,624 B2 * | 8/2009 | Kodama ............ H05K 13/0417 235/454 |

(Continued)

FOREIGN PATENT DOCUMENTS

| JP | 10-69689 | 3/1998 |
| JP | 2007-80308 | 3/2007 |

(Continued)

OTHER PUBLICATIONS

International Search Report and Written Opinion mailed Mar. 10, 2015, in corresponding PCT International Application.

*Primary Examiner* — Daniel St Cyr
(74) *Attorney, Agent, or Firm* — Finnegan, Henderson, Farabow, Garrett & Dunner, L.L.P.

(57) ABSTRACT

A device includes a recording medium housed in each of cells; an optically readable ID display part provided on a surface of the recording medium; an accessor that is movable to a position, which faces the ID display part, in an arrangement direction of the cells, and has an optical reading unit which optically reads an ID displayed in the ID display part; and a control unit that controls the optical reading unit. If the ID has not been read while the reading is tried a predetermined number of times, the control unit replaces the exposure value with another value to retry the reading. If the ID has not been read even though the exposure value was replaced a predetermined number of times, the control unit relatively moves the optical reading unit and the target cell and makes the optical reading unit read the ID again.

5 Claims, 5 Drawing Sheets

(51) Int. Cl.
  *G11B 15/68* (2006.01)
  *G11B 17/22* (2006.01)
  *G06K 7/14* (2006.01)
  *G06K 19/06* (2006.01)
(52) U.S. Cl.
  CPC .... *G06K 19/06028* (2013.01); *G11B 15/6835* (2013.01); *G11B 17/225* (2013.01)
(58) Field of Classification Search
  USPC .......................... 235/462.33, 462.38, 462.15
  See application file for complete search history.

(56) References Cited

U.S. PATENT DOCUMENTS

| | | | |
|---|---|---|---|
| 8,253,566 B2* | 8/2012 | Ichikawa | B41J 2/17546 |
| | | | 235/375 |
| 9,536,123 B2* | 1/2017 | Chau | G06K 7/10366 |
| 2011/0290040 A1* | 12/2011 | Tatsutani | G01N 35/04 |
| | | | 73/863.01 |

FOREIGN PATENT DOCUMENTS

| | | |
|---|---|---|
| JP | 5036609 | 9/2012 |
| JP | 2013-118006 | 6/2013 |
| WO | WO 2005/004142 A1 | 1/2005 |

\* cited by examiner

ID READING DEVICE

TECHNICAL FIELD

Cross-Reference to Related Patent Applications

This application is a National Stage Entry of International Application No. PCT/JP2015/050039, filed Jan. 5, 2015, which claims priority from Japanese Patent Application No. 2014-000851, filed Jan. 7, 2014. The entire contents of the above-referenced applications are expressly incorporated herein by reference.

The present invention relates to an ID reading device.

BACKGROUND ART

An example of the ID reading device that reads a code utilized to identify a target object has an accessor for transporting a cartridge which has a recording medium and a magazine for storing the cartridge in the cell. In this case, in order to read a bar code symbol on a bar code label applied to the cartridge, the accessor has a bar code reader (BCR).

Various technologies related to such devices are known (for example, see Patent Document 1).

For example, Patent Document 1 discloses an ID reading device which has a magazine having a plurality of cells for accommodating a stack of cartridges, a drive device for reading or writing data from or onto a recording medium in each cartridge, and an accessor mechanism for transferring the cartridge.

More specifically, in the above ID reading device, a pair of magazines are arranged in a manner such that opening portions (openings) of the cells of these magazines face each other, and the accessor mechanism has a swivel mechanism utilized to rotate a picker to perform the loading and unloading of the cartridge.

The accessor sequentially approaches the front of each cell while changing the position of the accessor mechanism. In this process, when light is emitted from an optical sensor toward a cartridge, if there is a predetermined reflection, it is determined that there is a cartridge, otherwise it is determined that there is no cartridge. Furthermore, each cartridge is identified by reading a bar code label attached to the cartridge by using the bar code reader.

PRIOR ART DOCUMENT

Patent Document

Patent Document 1: Japanese Patent No. 5036609.

DISCLOSURE OF INVENTION

Problem to be Solved by the Invention

In the ID reading device as described above, reading the bar code symbol by the bar code reader is performed by moving a bar code reader in front of a target cell and reading the bar code symbol on a bar code label.

However, in the bar code symbol reading of such an ID reading device, the bar code symbol may not read correctly due to variation in the material of the bar code label, reflection in the ID reading device, unfavorable reflection from the bar code label associated with the light emitting angle of the light source in the bar code reader, or the like.

In such a case, the above antenna element must retry the bar code symbol reading, which increases the time required to read the bar code symbol.

In a proposal to solve such a problem, a default exposure value is set to the bar code reader to execute the reading. In the relevant ID reading device, when the reading does not succeed with the default exposure value, reading is retried with a changed exposure value, which is repeated until the reading succeeds. However, in such an ID reading device, if the default exposure value significantly differs from an appropriate exposure value or there is a reflection from the bar code label, it is necessary to repeat the retry operation several times. As a result, the bar code symbol reading takes a lot of time and the above problem cannot be solved.

On the other hand, the invention described in Patent Document 1, the bar code symbol may not be read correctly due to variation in the material of the bar code label, reflection in the relevant device, unfavorable reflection from the bar code label associated with the light emitting angle of the light source, or the like. Therefore, similar to the above, the target problem cannot be solved.

Means for Solving the Problem

In order to solve the above problem, a first mode of the present invention has a recording medium housed in each of a plurality of cells;

an ID display part which is provided on a surface of the recording medium and is optically readable;

an accessor that is movable to a position, which faces the ID display part, in a direction along which the cells are arranged;

an optical reading unit which is provided integrally with the accessor and optically reads an ID displayed in the ID display part; and a control unit that controls the optical reading unit, wherein if the ID has not been read while the reading is tried a predetermined number of times or during a predetermined period of time, the control unit replaces an exposure value of the optical reading unit with another value and makes the optical reading unit read the ID again; and if the ID has not been read even though the exposure value was replaced a predetermined number of times, the control unit relatively moves the optical reading unit and one of the cells which is a target of the reading and makes the optical reading unit read the ID again.

The above disclosure of the invention does not include all features according to the present invention. Additionally, a sub-combination among the features also functions as the present invention.

Effect of the Invention

As clearly show in the above disclosure, in accordance with the present invention, it is possible to improve the reading accuracy of the bar code symbol and to reduce the work time required to retry the bar code symbol reading.

MODE FOR CARRYING OUT THE INVENTION

Hereinafter, the present invention will be described through embodiments of the invention. The following embodiments do not limit the invention according to the claims, and all combinations of features described in the embodiments are not necessarily essential to implement the invention.

Moreover, in the drawings, a portion or the entirety is shown schematically to explain the embodiments. Here the scale is appropriately changed, for example, a portion thereof may be enlarged or emphasized.

In the individual figures, the direction in the figure is shown by using an XYZ coordinate system. In this XYZ coordinate system, the XZ plane is a plane parallel to the horizontal plane. A moving direction of an accessor 13, which is parallel to the XZ plane, is defined as an "X direction", a direction perpendicular to the XZ plane is defined as a "Y direction", and a direction perpendicular to the Y direction is defined as an "X direction". For each of the X, Y, and Z directions, the direction of an arrow in each figure is a plus direction and the reverse thereof is a minus direction.

Figure 1:
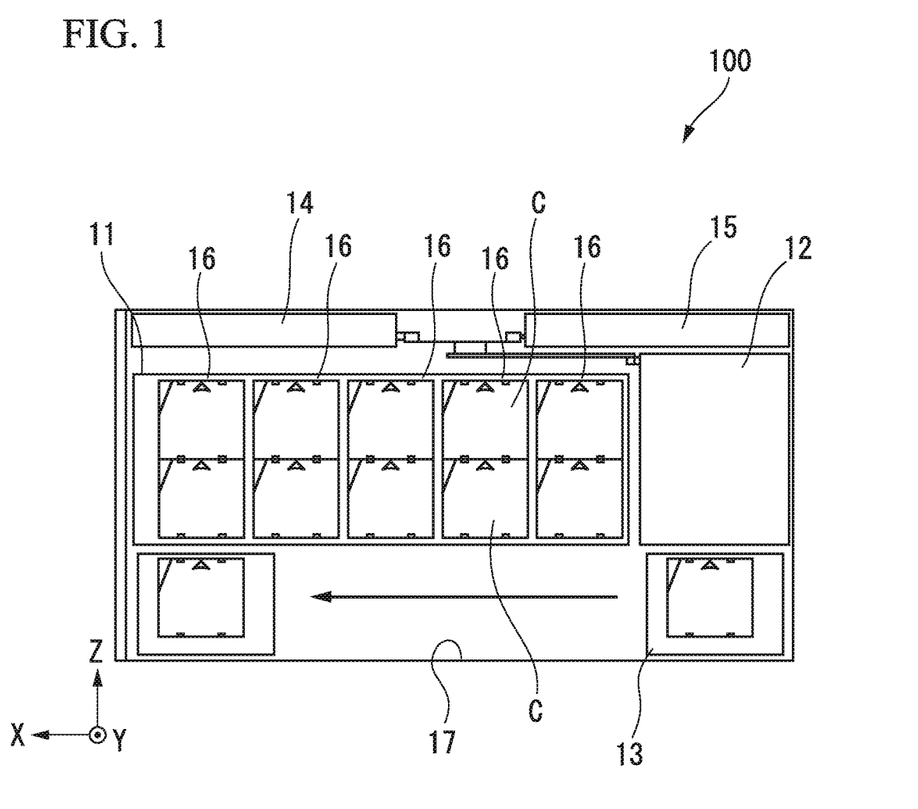
FIG. 1 is a plan view that shows the internal structure of an ID reading device 100 according to one embodiment.

FIG. 1 shows an example of an ID reading device 100 according to one embodiment. The ID reading device 100 has a magazine 11, a drive device 12, the accessor 13, a control unit 14, and an (electrical) power source 15, where the X direction for the magazine 11 is set to the front direction while the −X direction for the magazine 11 is defined as the rear side.

The magazine 11 has a plurality of cells 16 in which cartridges C, each functioning as the recording medium of the present invention, are housed in a horizontal position. Here, it is defined that each recording medium is contained in a relevant cartridge C.

In the magazine 11 of FIG. 1, a plurality of cells 16 are arranged in the X direction. However, the cells 16 are also arranged in the Y direction. In an example, each cell 16 contains two cartridges C.

Here, each cell 16 has a retraction space (not shown) where no cartridge C is stored. One cell 16 contains two cartridges C. The retraction space is provided because when a cartridge C stored on the back side (from the opening) is took out, it is necessary to temporarily retract another cartridge C stored in front of the above cartridge C to another place.

The drive device 12 is provided in the −X direction (i.e., on the rear side) of the magazine 11 and electrically connected to the control unit 14. The drive device 12 includes a reading unit and a writing unit (not shown) for performing reading and writing for the cartridge C selected by the control unit 14. The drive device 12 accepts a cartridge C, which is conveyed by the accessor 13 via a charging and discharging port (not shown) on the front side of the drive unit, and stores it in a container (not shown). The drive device 12 performs reading or readout of various types of data for the cartridge C. Moreover, after performing the reading or readout of various data, the drive device 12 passes the relevant cartridge C to the accessor 13 via the charging and discharging port.

The accessor 13 is provided in the −Z direction of the magazine 11 on the open side of the cells 16 so as to be flush with the cells 16. Therefore, a space at the open side of the cells 16 functions as a travelling space 17 of the accessor 13.

In the travelling space 17, the accessor 13 is movable between the cells 16 and the drive device 12 in the X direction, −X direction, Y direction and −Y direction. The accessor 13 pulls out a cartridge C, which is selected by the control unit 14, from a corresponding cell 16 and transports it to the drive device 12. The accessor 13 will be explained in detail later.

The control unit 14 includes a plurality of electronic elements (not shown) and is driven by a predetermined power supplied from the power source 15 so as to control the drive device 12, the accessor 13, and controls an optical reading unit 18 described later.

The control unit 14 also includes a nonvolatile memory (not shown) (EEPROM (Electrically Erasable Programmable Read-Only Memory)) in which initial exposure value information and initial reading position information of the accessor 13 are stored in advance.

The exposure value and the reading position are updated according to the reading by the optical reading unit 18.

The exposure value may be defined as follows. An EV value (i.e., exposure value) at an aperture (value) of F1 and an exposure time of 1 second is defined to be 0, where the EV value increases by one every time the aperture increases approximately 1.4 times or the amount of light reaching through the aperture is reduced by halve.

The reading position corresponds to an amount of movement of the accessor 13 in the X direction, −X direction, Y direction and −Y direction. The specific operation of the control unit 14 will be described later.

Figure 2:
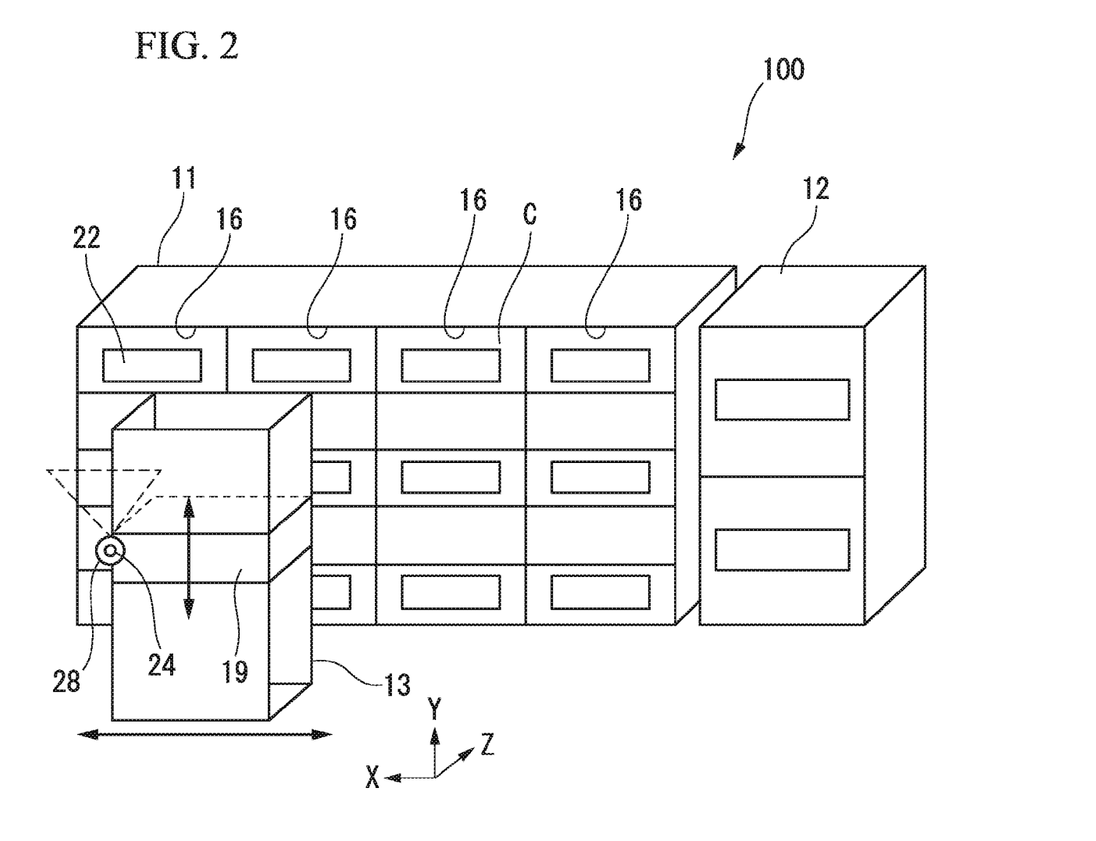
FIG. 2 is an external perspective view of the ID reading device 100 viewed from a side face thereof.
Figure 3:
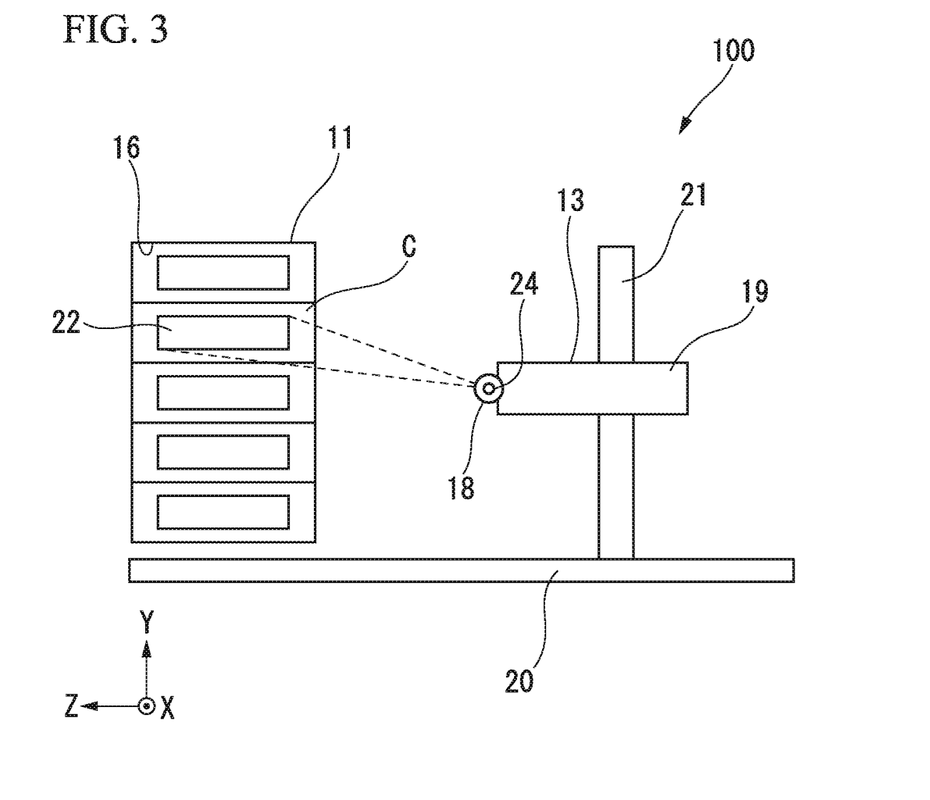
FIG. 3 is a side view utilized to explain the operation of the accessor 13 in the ID reading device 100.

FIG. 2 is an external perspective view of the ID reading device 100 viewed from a side face thereof. FIG. 3 is a side view utilized to explain the operation of the accessor 13 in the ID reading device 100.

As shown in FIGS. 2 and 3, the accessor 13 has the conveyor 19 which includes a cartridge container (not shown) to accommodate a cartridge C. This conveyor 19 has a drive mechanism (not shown) to move towards the vicinity of the opening of the magazine 11 and/or the charging and discharging port of the drive device 12 by guidance of a horizontal guide rail 20 and a vertical guide rails 21.

The drive mechanism of the conveyor 19 may be formed as a combination of a power source such as a stepping motor (not shown), a gear reduction mechanism, a rack, and a gear, which are also not shown, where the power source is electrically connected to electrical power source 15 via the control unit 14. Therefore, the power source of drive mechanism is driven by electric power supplied through the control section 14 so that the conveyor 19 moves in the X direction, −X direction, Y direction and −Y direction.

The above cartridge container of the accessor 13 has an opening (not shown) which can be positioned to face the opening of the magazine 11 and the charging and discharging port of the drive device 12, for which the insertion and removal of each cartridge C is performed. Additionally, in the conveyor 19 of the accessor 13, a picker mechanism (not shown) is provided to deliver the cartridge C between the conveyor 19 and the magazine 11 or the drive device 12.

In the accessor 13, when the conveyor 19 reaches the opening of a cell 16 in the magazine 11 or the charging and discharging port of the drive device 12 based on a control signal from the controller 14, the conveyor 19 performs (for the cell 16 or the drive device 12) insertion or removal of the cartridge C in the Z direction by holding a rear portion of the cartridge C by using the picker mechanism of the conveyor 19. In this operation, the accessor 13 positions the conveyor 19 so that the cartridge container directly faces the opening of the target cell 16 or the charging and discharging port of the drive device 12.

In addition, the optical reading unit 18 is provided in the conveyor 19, by which an ID 23 (see FIG. 4) on an ID display part 22, which is adhered to the cartridge C, is read. The ID display part 22 is a bar code label, and the ID 23 is a bar code symbol printed on the bar code label.

Figure 4:
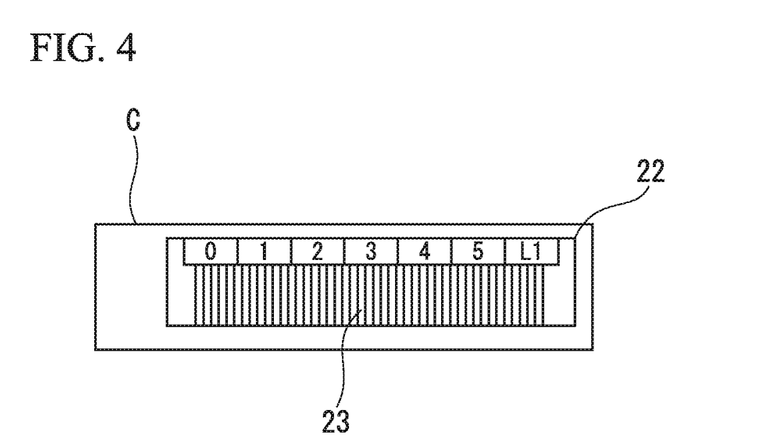
FIG. 4 is a plan view of the ID display part 22.

FIG. 4 is a plan view of the ID display part 22. As shown in FIG. 4, the ID 23 of the ID display part 22 displays information by using a combination with parts having a high (optical) reflectance and parts having a low reflectance, which can be optically read and may be a one-dimensional or two-dimensional symbol.

Here, the one-dimensional symbol displays information as a sequence which includes rectangular bars and spaces, which is machine-readable by scanning it in a direction perpendicular to the bars and spaces. In addition, the one-dimensional symbol is represented by using symbol characters, quiet zones, and gaps between the characters.

A one-dimensional symbol which indicates data characters by using narrow and wide elements is called a "binary width symbol" having types of Code 39 Interleaved 2 of 5, Codabar, or the like.

In (n, k) symbol codes as another example of the one-dimensional symbol, a data character consists of n modules and is also formed by using bar and spaces which have k different widths. The (n, k) symbol codes have types of EAN/UPC, Code 128, or the like.

The two-dimensional symbol has a form in which symbol characters or information unit equivalent thereto are arranged vertically and horizontally.

Figure 5:
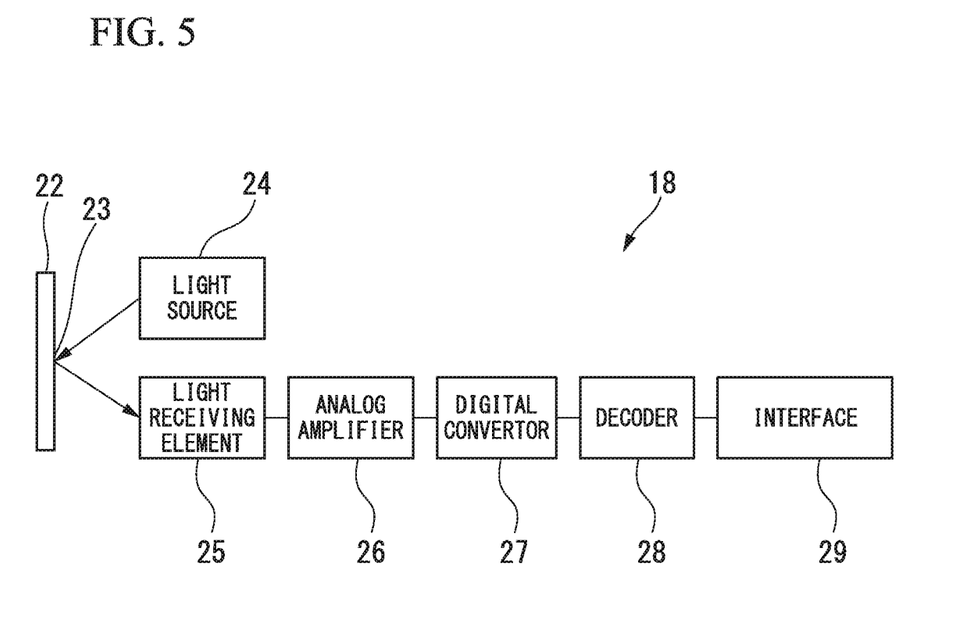
FIG. 5 is a block diagram of the optical reading unit 18.

FIG. 5 is a block diagram of the optical reading unit 18.

As shown in FIG. 5, the optical reading unit 18 is a non-contact type and is provided integrally with the accessor 13. The optical reading unit 18 may include functional units such as a light source 24, a light receiving element 25, an analog amplifier 26, a digital convertor 27, a decoder 28, and an interface 29, which are electrically connected to the controller 14.

The light source 24 may be light emitting elements such as LEDs, a halogen lamp, a semiconductor laser, or the like.

The light receiving element 25 is an optical element capable of changing its exposure value and detects difference in brightness between light components reflected by the ID 23 after the light emission of the light source 24. The light receiving element 25 may be a CCD line sensors having CCD elements arranged in series, a CMOS image sensor having sensor elements arranged vertically and horizontally in a plane, a photodiode, or the like.

Since the signal of each light component received by the light receiving element 25 is a weak analogue signal, it is amplified by the functional units of the analog amplifier 26 and the digital convertor 27 so digitizing the signal by using a threshold into conformity with a standard. Accordingly, each "space" having a high reflectance is converted to a digital signal of "0" while each "bar" having a low reflectance is converted to a digital signal of "1".

The decoder 28 (functional unit) converts electrical information of the ID 23 to character codes which are recorded in a nonvolatile memory in the control unit 14 via the interface 29. Then, the control unit 14 obtains the contents of the ID 23 based on the recorded data.

The optical reading unit 18 is not limited to the above-described structure and may be a fixed laser scanner, a fixed imager, or the like.

Figure 6:
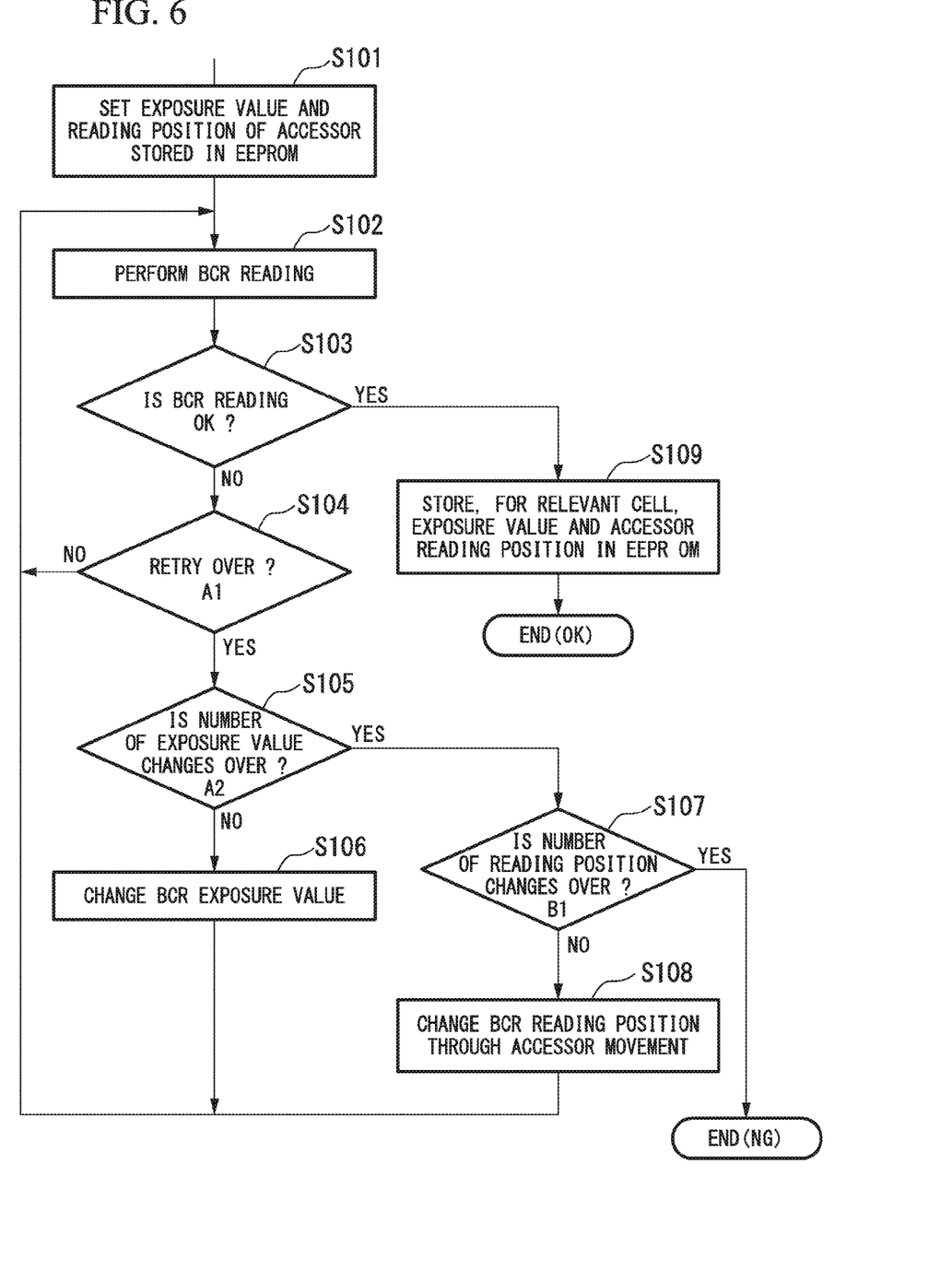
FIG. 6 is a flowchart utilized to explain the control operation of the ID reading device 100.

FIG. 6 is a flowchart utilized to explain the control operation of the ID reading device 100. As shown in FIG. 6, the control unit 14 starts the control by using the initial exposure value and the initial reading position of the accessor 13, which are stored in a nonvolatile memory (EEPROM) in advance (see step S101).

When the accessor 13 is on the initial position which faces the drive device 12, a cartridge C is selected by the control unit 14. The conveyor 19 of the accessor 13 is moved to the position of the selected cartridge via the guide of the horizontal guide rail 20 and the vertical guide rail 21 in the X direction, −X direction, Y direction and −Y direction so as to face the selected cartridge C.

Then, while the accessor 13 faces the selected cartridge C, the control unit 14 drives the optical reading unit 18 to read the ID 23 by means of the light source 24 and the light receiving element 25 (so-called "BCR Reading") (see step S102).

Next, the control unit 14 determines whether or not the ID 23 can be read (see step S103).

If the control unit 14 determines that the ID 23 cannot be read, it is further determined whether or not the number of retries for reading the ID 23 at the current exposure value exceeds a predetermined threshold value A1 (see step S104). If it is determined to be "NO", the operation returns to step S102 to perform the BCR reading operation again.

During the retry operation of reading the ID 23 is repeated, if the number of retries exceeds the threshold A1, it is determined in step S104 to be "YES".

In this case, the control unit 14 determines that the reading is impossible at the current exposure value due to variation in the material of the ID display part 22 or reflection in the ID reading device 100, and the operation proceeds to step S105. In this step, it is determined whether or not the number of exposure value changes (i.e., number of times when the exposure value is changed) exceeds a predetermined threshold value A2. If it is determined to be "NO", the control unit 14 replaces the current exposure value with a new exposure value (see step S106).

Then, the control unit 14 executes steps S102, S103, and S104 repeatedly to retry the reading of ID 23 by using the new (changed) exposure value.

While the ID 23 cannot be read, such an exposure value changing operation is repeated until it is determined in step S105 to be "YES". When it is determined to be "YES" in step S105, the control unit 14 determines that the reading cannot succeed at the current reading position even if the exposure value is further changed, and the operation proceeds to step S107. In this step, it is determined whether or not the number of reading position changes (i.e., number of times when the reading position is changed) exceeds a predetermined threshold value B1. If it is determined to be "NO", the control unit 14 replaces the current reading position with a new reading position (see step S108).

Then, the control section 14 performs the operation from steps S102 to step S107 at the new reading position. That is, at the new (changed) reading position of the accessor 13, the retry of the reading of the ID 23 is performed by using the optical reading unit 18 while the above-described exposure value changes are also performed (the number of retries and the like are appropriately reset).

While the ID 23 cannot be read, the above exposure value changing operation and the reading position changing operation are repeated until it is determined in step S107 to be "YES".

If the ID 23 can be read during the repetition, the control unit 14 stores, for the cell 16 which contains the selected cartridge C, a proper (final) exposure value and a proper reading position of the accessor 13 (which corresponds to a relative movement between the relevant cell and the accessor) in a nonvolatile memory (see step S109).

Then, the reading is completed by the optical reading unit 18, and in the following operation, the exposure value and the reading position of the accessor 13 stored in the nonvolatile memory are referred to.

In contrast, if it is determined to be "YES" in the step S107 while the ID 23 cannot be read, the control unit 14 determines that the reading is impossible and terminates the relevant operation. In this case, the exposure value and the reading position of the accessor 13 are not updated.

As described above, when the ID 23 cannot be read through the number of retries defined by the threshold A1, the control unit 14 replaces the exposure value of the optical reading unit 18 with another value so as to make the optical reading unit 18 read the ID 23 again. In addition, when the ID 23 cannot be read even though a predetermined number (A2) of exposure value changes, the control unit 14 relatively moves the optical reading unit 18 and the cell 16 which has the ID 23 as the reading target, so as to make the optical reading unit 18 read the ID 23 again.

In addition, the control unit 14 records the above exposure value and the above amount of relative movement for each cell 16 and sets the exposure value of the optical reading unit 18 to the exposure value recorded for the target cell 16. In addition, after the control unit 14 moves the accessor 14 by a distance corresponding to the recorded amount of movement, the control unit 14 controls the optical reading unit 18 to optically read the ID 23 of the relevant cell 16.

In another example, the control unit 14 may record the above exposure value and the above amount of relative movement for each cartridge C and set the exposure value of the optical reading unit 18 to the exposure value recorded for the target cartridge C. Similarly, after the control unit 14 moves the accessor 14 by a distance corresponding to the recorded amount of movement, the control unit 14 may control the optical reading unit 18 to optically read the ID 23 of the relevant cartridge C.

As described above, in the ID reading device 100 of the present embodiment, the control unit 14 performs the reading of the ID 23 while changing the exposure value and the position to which the accessor 13 moves. Therefore, it is possible to improve the reading accuracy of the ID 23 and to reduce the time required to perform the retry operation for the reading of the ID 23.

In addition, in the ID reading device 100 of the present embodiment, the control unit 14 records a proper exposure value and an amount of relative movement for each cell 16 and sets the exposure value of the optical reading unit 18 to the exposure value recorded for the target cell 16. In addition, after the control unit 14 moves the accessor 14 by a distance corresponding to the recorded amount of movement, the control unit 14 controls the optical reading unit 18 to optically read the ID 23 of the relevant cell 16. Therefore, the ID reading device 100 can improve the reading accuracy of each cell 16.

Furthermore, in the ID reading device 100 of the present embodiment, the control unit 14 may record a proper exposure value and an amount of relative movement for each cartridge C and sets the exposure value of the optical reading unit 18 to the exposure value recorded for the target cartridge C. In addition, after the control unit 14 moves the accessor 14 by a distance corresponding to the recorded amount of movement, the control unit 14 may control the optical reading unit 18 to optically read the ID 23 of the relevant cartridge C. Therefore, the ID reading device 100 can improve the reading accuracy of each cartridge C.

Additionally, in the ID reading device 100 of the present embodiment, the control unit 14 utilizes the threshold A1 for changing the exposure value and the threshold A2 for changing the position to which the accessor 13 moves. Therefore, in comparison with a method which simply sets a plurality of exposure values, the reading accuracy of the ID 23 by using the optical reading unit 18 can be remarkably improved.

The optical reading unit 18 of the ID reading device 100 of the present embodiment has the light source 24 for irradiating the ID display part 22 and the light receiving element 25 for receiving light components reflected by the ID display part 22. Therefore, the reading can be reliably performed in synchronization with the movement of the accessor 13.

In addition, the ID reading device 100 is not limited to the embodiment described above, and appropriate modifications and improvements may be performed.

This application claims priority based on Japanese Patent Application No. 2014-000851, filed Jan. 7, 2014, the contents of which are incorporated herein by reference.

INDUSTRIAL APPLICABILITY

In accordance with the present invention, it is possible to improve the reading accuracy of the bar code symbol and to reduce the work time required to retry the bar code symbol reading.

REFERENCE SYMBOLS

100 ID reading device
11 magazine
12 drive device
13 accessor
14 control unit
15 power source
16 cell
17 traveling space
18 optical reading unit
19 conveyor
20 horizontal guide rail
21 vertical guide rail
22 ID display part
23 ID
24 light source
25 light receiving element
26 analog amplifier
27 digital convertor
28 decoder
29 interface
A1, A2, B1 threshold
C cartridge

The invention claimed is:
1. An ID reading device, comprising:
a recording medium housed in each of a plurality of cells;
an ID display part which is provided on a surface of the recording medium and is optically readable;
an accessor that is movable to a position, which faces the ID display part, in a direction along which the cells are arranged;
an optical reading unit which is provided integrally with the accessor and optically reads an ID displayed in the ID display part;

a memory which stores an initial exposure value and an initial reading position of the optical reading unit for a cell having the ID that is a target of reading by the optical reading unit; and a control unit that controls the optical reading unit, the control unit being configured to:

position the optical reading unit at the initial reading position and cause the optical reading unit to read the ID with the initial exposure value as an exposure value of the optical reading unit;

replace the exposure value of the optical reading unit with a new exposure value and cause the optical reading unit to read the ID again with the replaced exposure value when the optical reading unit cannot correctly read the ID after having tried to read the ID a predetermined number of times or during a predetermined period of time;

move the optical reading unit to a new reading position different from the initial reading position and cause the optical reading unit to read the ID again when the optical reading unit cannot correctly read the ID even after the exposure value has been replaced by the predetermined number of times; and store the new exposure value and the new reading position in the memory, when the optical reading unit has correctly read the ID, by replacing the initial exposure value and the initial reading position in the memory with the new exposure value and the new reading position, respectively.

2. The ID reading device in accordance with claim 1, wherein:

the control unit stores, for each cell, the initial exposure value and the initial reading position in the memory.

3. The ID reading device in accordance with claim 1, wherein:

the control unit stores, for each recording medium, the initial exposure value and the initial reading position in the memory.

4. The ID reading device in accordance with claim 1, wherein the control unit utilizes a first threshold for determining the new exposure value and a second threshold for determining the new position of the optical reading unit.

5. The ID reading device in accordance with claim 1, wherein the optical reading unit has a light source which irradiates the ID display part and a light receiving element which receives a light component reflected by the ID display part.

* * * * *